(12) United States Patent
Wagner

(10) Patent No.: US 7,357,416 B2
(45) Date of Patent: Apr. 15, 2008

(54) DEVICE FOR STABILIZING A SINGLE-TRACK VEHICLE AND SINGLE-TRACK VEHICLE COMPRISING SUCH A DEVICE

(75) Inventor: Arnold Wagner, Winterthur (CH)

(73) Assignee: Peraves Aktiengesellschaft, Winterthur (CH)

( * ) Notice: Subject to any disclaimer, the term of this patent is extended or adjusted under 35 U.S.C. 154(b) by 376 days.

(21) Appl. No.: 10/523,456

(22) PCT Filed: Jul. 3, 2003

(86) PCT No.: PCT/CH03/00439

§ 371 (c)(1),
(2), (4) Date: Jan. 25, 2005

(87) PCT Pub. No.: WO2004/014716

PCT Pub. Date: Feb. 19, 2004

(65) Prior Publication Data

US 2005/0248140 A1 Nov. 10, 2005

(30) Foreign Application Priority Data

Aug. 9, 2002 (CH) .................................... 1383/02

(51) Int. Cl.
*B60G 21/045* (2006.01)
*B60G 21/067* (2006.01)
*B60G 17/00* (2006.01)
*B60S 9/00* (2006.01)
*B62D 49/08* (2006.01)

(52) U.S. Cl. ................ 280/764.1; 280/755; 280/5.506; 280/5.507

(58) Field of Classification Search ............. 280/764.1, 280/5.506, 5.507, 755
See application file for complete search history.

(56) References Cited

U.S. PATENT DOCUMENTS

| | | | | |
|---|---|---|---|---|
| 2,750,204 A | * | 6/1956 | Ohrmann ..................... | 280/755 |
| 2,767,995 A | * | 10/1956 | Stout .......................... | 280/755 |
| 3,397,898 A | * | 8/1968 | Denney et al. ............. | 280/755 |
| 4,145,959 A | * | 3/1979 | Burden et al. .................... | 92/8 |

(Continued)

FOREIGN PATENT DOCUMENTS

EP 0097623 A1 1/1984

(Continued)

*Primary Examiner*—Christopher P. Ellis
*Assistant Examiner*—John R. Olszewski
(74) *Attorney, Agent, or Firm*—Townsend and Townsend and Crew, LLP

(57) ABSTRACT

The device for stabilizing a single-track vehicle comprises a supporting device (4) and an adjusting device (14) which is intended for selective lowering and raising of support elements and which can be actuated by way of a control device (10). The control device (10) can be influenced as a function of a combination of control signals from a speedometer which senses the speed of the vehicle and of a transverse acceleration meter. The adjusting device (14) comprises at least one supporting and actuating element (15) which can be influenced in combination by way of the control device (10) and/or by signals from the driver and is intended for extending and retracting the supporting device (4), as well as means for selective locking, unlocking, tensioning and extending of the supporting and actuating element (15). This device makes possible automatic lowering or raising of the supporting device (14) without additional operating requirements.

6 Claims, 2 Drawing Sheets

U.S. PATENT DOCUMENTS

| | | | |
|---|---|---|---|
| 4,826,194 A * | 5/1989 | Sakita | 285/302 |
| 5,048,864 A | 9/1991 | Geiger | |
| 5,378,020 A * | 1/1995 | Horn | 280/755 |
| 5,401,055 A * | 3/1995 | Pham | 280/755 |
| 5,794,966 A * | 8/1998 | MacLeod | 280/5.507 |
| 5,904,218 A * | 5/1999 | Watkins | 180/209 |
| 5,931,499 A * | 8/1999 | Sutherland | 280/755 |
| 6,170,847 B1 * | 1/2001 | Pham | 280/298 |
| 6,213,237 B1 * | 4/2001 | Willman | 180/209 |
| 2005/0035583 A1 * | 2/2005 | Hinton | 280/755 |
| 2005/0167961 A1 * | 8/2005 | Murata et al. | 280/755 |

FOREIGN PATENT DOCUMENTS

| | | |
|---|---|---|
| JP | 2001-253376 A | 9/2001 |
| WO | WO 00/34112 A | 6/2000 |

* cited by examiner

DEVICE FOR STABILIZING A SINGLE-TRACK VEHICLE AND SINGLE-TRACK VEHICLE COMPRISING SUCH A DEVICE

BACKGROUND OF THE INVENTION

The invention relates to a device for stabilizing a single-track vehicle and also to a single-track vehicle provided with such a device.

Single-track vehicles, for example motorcycles or bicycles, are inherently stable at sufficient travel speed, but on stopping they must be supported by the driver's feet or by means of a supporting device, for instance with runners or supporting rollers, in order to prevent tipping over. On fully-enclosed two-wheeled vehicles, which do not allow foot support because of the bodywork, supporting devices with lateral supporting rollers are known which are raised at higher speeds so that single-track banking turning is possible for travelling at speed. Similar devices are also used on single-track vehicles for disabled people, people of small stature and for learning and test drives. It has also been proposed that the raising of the supporting device for travelling at speed or the lowering thereof for stabilization on stopping be coupled to the speedometer signal and to initiate appropriate actuation automatically at a specific speed or at least to give the driver a warning signal that actuation is required. This simple coupling to the speed signal has not proved successful in practice. In fact, if there is unilateral loading of the supporting device, for instance when turning or in the case of a laterally inclined roadway, then the vehicle can tilt to one side when the supporting device is raised in spite of sufficient speed.

A device of the type referred to in the introduction is known from EP 0 097 623 B1 which comprises in addition to the speedometer a transverse acceleration meter which should prevent raising in the event of unilateral loading or should effect lowering in spite of sufficient speed in the event of increasing transverse acceleration, a sign of imminent tipping. The use of the speedometer signal taking account of the transverse acceleration as a parameter for the raising or lowering of the device has proved a suitable and reliable method of indicating the possibility of actuation to the driver when driving cabin motorcycles. However, it may be regarded as a disadvantage that it is relatively difficult for the driver to become accustomed to the different steering behavior of the vehicle when he raises the supporting device in response to this indication. With lowered supporting rollers, i.e. in multi-track vehicle mode, turning of the steering device in the clockwise direction produces a right turn. With the supporting rollers raised in single-track mode the same actuation of the steering device inclines the vehicle to the left and consequently produces a left turn. Thus automatic actuation of the supporting device is practically ruled out, because the driver can be surprised by this change in the steering behavior and thus there is a danger of actuating the steering device in the wrong direction. Thus this known design is suitable in particular for use in fail-passive systems which prevent incorrect actuations of the supporting device in that for example the raising of the supporting device initiated by the driver is only possible at sufficient travelling speed and without transverse acceleration, and the lowering of the supporting device again initiated by the driver is only allowed under appropriate conditions. However, by comparison with conventional single-track vehicles with foot support this results in changed operating requirements, and a considerable relearning phase is inevitable.

SUMMARY OF THE INVENTION

An object of the present invention is to create a modified device of the type referred to in the introduction which is improved particularly in this respect and in which the aforementioned disadvantages do not occur.

The advantages of the invention are to be seen principally in the fact that in a simple manner a reliable stabilizing device can be achieved in which the change in steering behavior which requires habituation is shifted to the slow marginal range of the travel mode, and thus actuation of the steering in the wrong direction is avoided and the stability of the vehicle is correspondingly improved. The device designed according to the invention does not require any special relearning phase for riders of bicycles, facilitates automatic actuation of the supporting device without additional operating requirements and additionally allows a safe introduction to two-wheeled driving techniques for the unskilled.

The invention is explained with reference to an embodiment shown schematically in the drawings.

DESCRIPTION OF THE PREFERRED EMBODIMENTS

Figure 1:
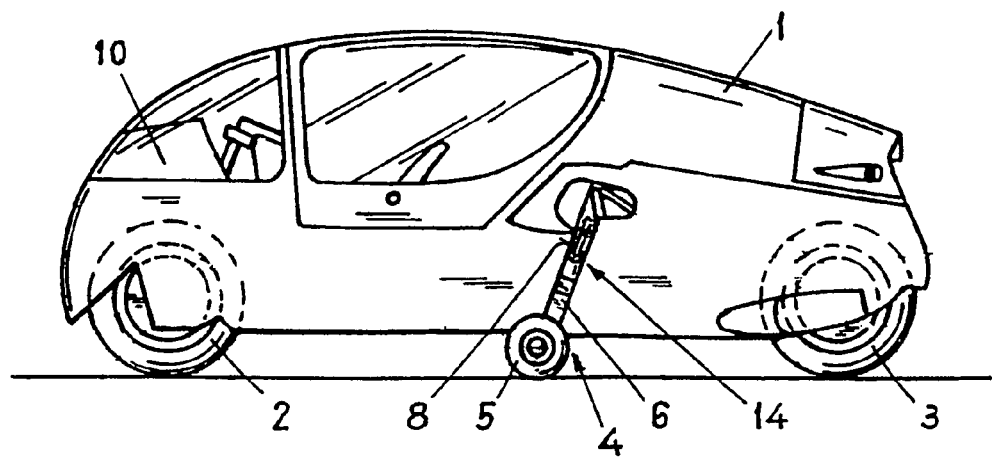
FIG. 1 shows a side view of a single-track vehicle provided with a device according to the invention.

The single-track vehicle according to FIG. 1, which in this illustration is a cabin motorcycle, has a body 1, a front wheel 2, a rear wheel 3 and a stabilizing device comprising a supporting device 4 with supporting rollers 5. The supporting rollers 5 are each supported on a respective supporting strut 6, 7 which can be pivoted in and out. The supporting struts 6 and 7 are each led out through a slot 8 provided in the body 1, and they are each adjustable in the respective slot between an illustrated lowered supporting position and a raised rest position. The supporting device 4 can be actuated by way of a control device 10 which is provided in the vehicle and which can be influenced as a function of control signals from a speedometer (not shown) which senses the speed of the vehicle and of control signals from a transverse acceleration meter (not shown).

Figure 2:
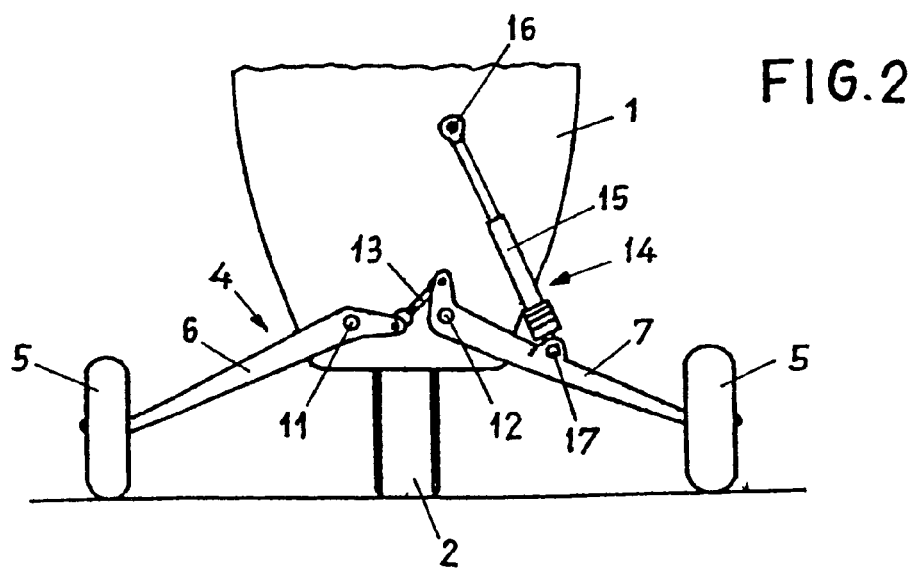
FIG. 2 shows a transverse view from behind a device according to the invention for stabilizing the single-track vehicle.
Figure 3:
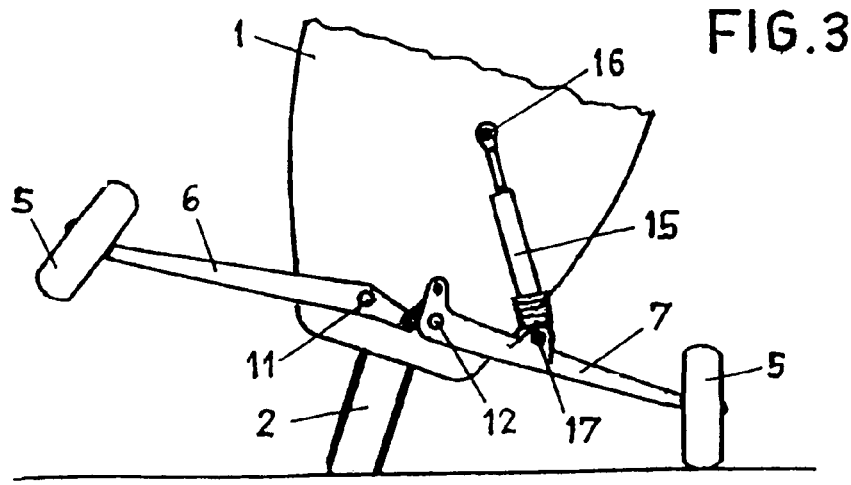
FIG. 3 shows the device according to FIG. 2 in a second operating position.
Figure 4:
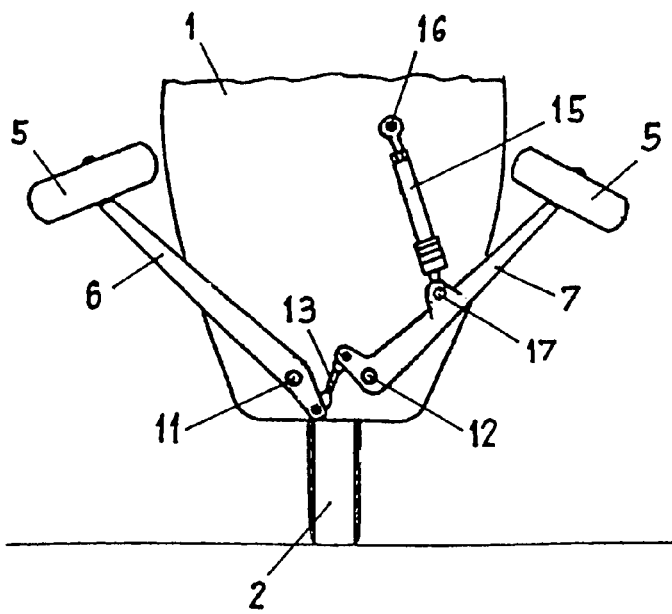
FIG. 4 shows the device according to FIG. 2 in a third operating position.

As can be seen from FIGS. 2 to 4, the supporting struts 6 and 7 are pivotably articulated with their mutually facing ends at two bearing points 11 and 12 on the vehicle and are coupled to one another so as to be adjustable synchronously by way of a spring element 13 provided with a damping device. The supporting device 4 can be actuated by way of an adjusting device 14 which comprises a supporting and actuating element 15 which can be influenced in combination by control signals from the control device 10 and/or from the driver and which is articulated on the vehicle and on the supporting strut at respective bearing points 16, 17.

FIG. 2 shows the supporting device 4 with the preceding supporting and actuating element 15 in an extended rigid position with lateral support approximately vertical with respect to the road surface, in a manner which has yet to be described, whereby this setting results in direct driving behavior of a multi-track vehicle.

FIG. 3 shows the supporting device 4 with the preceding supporting and actuating element 15 in a loose setting, which has yet to be described, which allows a slightly damped inclination of the vehicle by steering in the opposite direction as in an unsupported single-track vehicle.

FIG. 4 shows the supporting device 4 with the preceding supporting and actuating element 15 in a tensioned setting which allows unsupported single-track travel with freedom of inclination.

According to a modified embodiment (not shown), each of the two supporting struts 6 and 7 can be preceded by its own supporting and actuating element 15 which can be influenced in combination.

Figure 5:
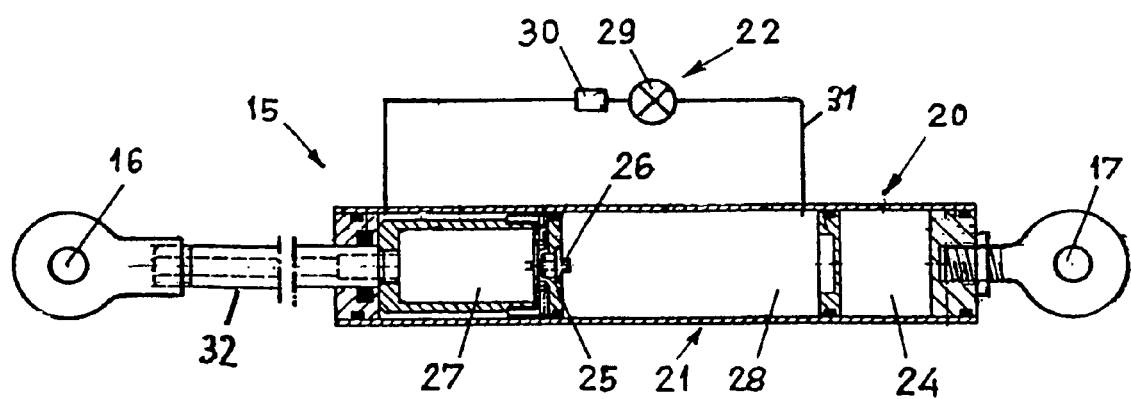
FIG. 5 shows a longitudinal sectional view of a detail of the device according to FIG. 2 on an enlarged scale.

FIG. 5 shows an embodiment of the supporting and actuating elements 15 which can be influenced in combination with a piston/cylinder arrangement 20 which is closed towards the exterior and contains a lockable hydraulic gas spring 21 with a tensioning device 22. The hydraulic gas spring 21 comprises a gas chamber 24, a hydraulic fluid chamber 28 which is separate therefrom and a piston 25 which is guided in the latter and which produces the RIGID (closed) or LOOSE (open) states by hydraulic displacement transmission with a through-flow valve 26 which can be activated electrically or by other actuating means, in the illustration by means of an electromagnet 27, and is capable of being closed and opened.

The gas chamber 24 is intended to accommodate a pressure medium for spring suspension, for extending the supporting struts 6, 7, for storing the energy of extension in the tensioned state and for volume equalization. The hydraulic gas spring 21 can be tensioned by an externally acting force when the through-flow valve 26 is open or by pumping round hydraulic fluid to the other side of the piston when the through-flow valve 26 is closed, and can be locked hydraulically or mechanically in the tensioned position, so that when this locking is released the stored energy is used for lowering the stabilizing device into the supporting state. The tensioning device 22 comprises a hydraulic pump 29 with a control valve 30 which is intended for pumping round the hydraulic fluid during the tensioning operation and in the opposite direction of rotation can act to assist in extending the supporting struts.

According to a modified embodiment (not shown) which is likewise closed towards the exterior, the gas chamber 24 and also the through-flow valve 26 can also be installed in or connected to the connecting line 31 outside the gas spring 21, which is thereby reduced to a double-acting servo cylinder, thus allowing a reduction in the overall length of the supporting and actuating element while at the same time increasing the actuating path. In this design also it is characteristic that the hydraulic system is closed per se and the internal pressure which is increased by the retraction of the piston rod 32 of the actuating element can be activated as an energy store for lowering the stabilizing device with a simple opening of the valve 30.

The combinable supporting and actuating element 15 which is provided according to the invention and is to precede the supporting device 4 is influenced by speed and transverse acceleration signals and/or by the driver, i.e. set to RIGID or LOOSE, EXTENDED or TENSIONED, and accordingly produces reliable support when stationary and/or inclined travel in a lowered position and automatic raising for single-track travel or lowering before stopping. Thus by means of the stabilizing device improved according to the invention the following operating states are possible:

RIGID (FIG. 2):

The rigid supporting and actuating element 15, constructed for example as a locked hydraulic gas spring, effects support of the vehicle approximately perpendicular to the road surface and is used during parking, maneuvering, reversing, at low speeds and/or on a slippery surface. Steering actions are direct; i.e. turning the steering means to the left=left turn, e.g. with a tandem or tricycle. In this state the element 15 is used as a spring suspension for the stabilizing device by small changes in length under fluctuating loads.

LOOSE (FIG. 3):

Upon setting off, the extending supporting and actuating element 15 can be triggered automatically by an increasing speedometer signal and/or by a signal initiated by the driver, but only in the case of lateral balance, i.e. with low transverse acceleration, in that in the illustrated example the hydraulic gas spring is unlocked, which with the supporting device 4 lowered and in forward travel mode allows vehicle operation as a single-track vehicle with steering in the opposite direction and inclined positions when turning, whereby the supporting device on one side or on both sides follows the road surface, and if transverse acceleration occurs or upon stopping it is possible to switch over immediately to RIGID automatically due to a decreasing speedometer signal or an increasing transverse acceleration signal or triggered by a signal from the driver, so that tipping over is prevented. In addition, if the vehicle is in an inclined position it can be righted by the EXTENDING hydraulic pump activated against the tensioning direction and in the extreme case even if the vehicle is lying on its side it can be raised again in this way.

TENSIONED (FIG. 4):

From the LOOSE operating state the supporting device 4 can be raised at any time automatically by tensioning the supporting and actuating element 15 or in response to a signal from the driver without the driving behavior of the vehicle changing. By means of an internal or external tensioning device 22, the combinable supporting and actuating element 15 can be changed in length, i.e. TENSIONED, as illustrated by pumping round the hydraulic fluid in the hydraulic gas spring 21 to the opposite side of the piston, or by mechanical tensioning from the exterior, in such a way that the supporting device 4 is raised and the freedom of inclination of the vehicle for single-track operation is ensured.

From this operating state, due to a decreasing speedometer signal and/or signal from the driver, first of all a safety lock against inadvertent lowering is overcome and then the supporting and actuating element 15 is released either automatically or in response to a signal from the driver and is quickly lowered and transferred to the LOOSE state (FIG. 3) by the energy which was previously accumulated during tensioning and is now released, and again this does not cause any change to the driving behavior and thus also does not require any resetting by the driver. In the event of a further reduction in the speedometer signal, and possibly also in the event of transverse acceleration occurring (=a sign of the start of tipping over), the supporting and actuating element 15 changes over automatically or in response to a signal from the driver into the EXTENDING and RIGID state (FIG. 2) and safe stopping without the danger of tipping and/or righting of the vehicle is thereby ensured.

The invention claimed is:

1. Device for stabilizing a single-track vehicle, with a supporting device and an adjusting device which is intended for selective lowering and raising of support elements and which can be actuated by way of a control device which can be influenced as a function of control signals from a speedometer which senses the speed of the vehicle and of a transverse acceleration meter, the adjusting device comprising at least one supporting and actuating element which can be influenced in combination by way of the control device or by signals from the driver for extending and retracting the supporting device and tensioning against the supporting device, as well as means for selective locking, unlocking, tensioning and extending of the supporting and actuating element, the supporting and actuating element including a hydraulic gas spring which is closed towards the exterior and which comprises a gas chamber as volume equalization and energy store, and a hydraulic fluid chamber which is separate therefrom and a piston which is guided in the latter and which provides for a hydraulic displacement transmission, said piston being provided with a through-flow valve for hydraulic fluid adapted to be actuated by means of one of the control signals and the signal from the driver for being closed or opened, wherein the means for selective locking, unlocking, tensioning and extending of the supporting and actuating element comprises a hydraulic pump for pumping hydraulic fluid from one side of the piston to the other side of the piston or vice versa during tensioning or extending of the supporting and actuating element.

2. Device as claimed in claim 1, with two supporting struts, one for each supporting roller, which can be pivoted in and out, the supporting struts being coupled to one another so as to be adjustable synchronously and the supporting and actuating element being coupled to one of these supporting struts.

3. Device as claimed in claim 1, with two supporting struts, one for each supporting roller, which can be pivoted in and out, each of the supporting struts being coupled to its own supporting and actuating element.

4. Device as claimed in claim 1, including at least one of electric, pneumatic and mechanical means for controlling and adjusting the supporting and actuating element into the RIGID, LOOSE, TENSIONED and EXTENDING states.

5. Single-track vehicle with a stabilizing device as claimed in claim 1.

6. Device as claimed in claim 1, wherein the means for selective locking, unlocking, tensioning and extending of the supporting and actuating element comprise a control valve for controlling a flow of the hydraulic fluid from one side of the piston to the other side of the piston or vice versa.

* * * * *